US012657597B2

(12) United States Patent (10) Patent No.: US 12,657,597 B2

Oliveira et al. (45) Date of Patent: Jun. 16, 2026

(54) PERSONAL CORPORATE SURVEY CHATBOT MANAGEMENT

(71) Applicant: ADP, Inc., Roseland, NJ (US)

(72) Inventors: Israel Oliveira, Porto Alegre (BR);
Cristian Basilio, Porto Alegre (BR);
Douglas Parnoff, Porto Alegre (BR);
Leandro Pereira, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 359 days.

(21) Appl. No.: 18/198,246

(22) Filed: May 16, 2023

(65) Prior Publication Data

US 2023/0289838 A1 Sep. 14, 2023

Related U.S. Application Data

(63) Continuation of application No. 17/016,830, filed on Sep. 10, 2020, now abandoned.

(51) Int. Cl.
| | |
|---|---|
| *G06Q 30/0203* | (2023.01) |
| *G06F 40/20* | (2020.01) |
| *G06Q 10/0637* | (2023.01) |
| *G06Q 10/105* | (2023.01) |
| *H04L 51/02* | (2022.01) |

(52) U.S. Cl.
CPC ......... *G06Q 30/0203* (2013.01); *G06F 40/20* (2020.01); *G06Q 10/0637* (2013.01); *G06Q 10/105* (2013.01); *H04L 51/02* (2013.01)

(58) Field of Classification Search
CPC .. H04L 51/02; G06Q 10/105; G06Q 10/0637; G06Q 30/0203; G06F 40/20
See application file for complete search history.

(56) References Cited

U.S. PATENT DOCUMENTS

| | | | |
|---|---|---|---|
| 2016/0170998 A1 | 6/2016 | Frank et al. | |
| 2019/0019204 A1 | 1/2019 | Kopikare et al. | |
| 2019/0066136 A1* | 2/2019 | Kopikare | G06N 5/046 |
| 2019/0174289 A1* | 6/2019 | Martin | H04M 3/5141 |
| 2019/0205908 A1* | 7/2019 | Perona | G06Q 30/0203 |
| 2020/0080739 A1* | 3/2020 | Koss | F24F 11/62 |
| 2020/0234220 A1* | 7/2020 | Ma | G08G 1/148 |
| 2021/0065705 A1* | 3/2021 | Ham | G06V 40/172 |

(Continued)

OTHER PUBLICATIONS

Take, "Ada: The Revolution of the First Chatbot for Communication With Employees", accessed Aug. 21, 2020, https://take.nel/blog/institucional/chatbot-para-comunicacao-com-funcionarios, Jul. 13, 2018, 10 pages.

(Continued)

*Primary Examiner* — Deirdre D Hatcher
(74) *Attorney, Agent, or Firm* — Foley & Lardner LLP

(57) ABSTRACT

Analyzing chatbot/employee dialogs is provided. An analysis of a dialog between a chatbot manager and a plurality of employees regarding a current corporate topic is performed using an artificial intelligence component. Relevant information regarding the current corporate topic is extracted from the dialog based on the analysis. Insights corresponding to the relevant information regarding the current corporate topic are generated using the artificial intelligence component. The relevant information regarding the current corporate topic and the insights are displayed in a dashboard on a client device of a human resource agent.

20 Claims, 5 Drawing Sheets

(56)                References Cited

U.S. PATENT DOCUMENTS

| | | | |
|---|---|---|---|
| 2021/0072718 A1* | 3/2021 | Rucco | G06Q 10/063114 |
| 2021/0089860 A1* | 3/2021 | Heere | G06N 20/00 |
| 2021/0209698 A1 | 7/2021 | Bellingan et al. | |
| 2021/0374469 A1* | 12/2021 | Molapo | G06F 18/214 |
| 2022/0310079 A1* | 9/2022 | Kalns | G10L 13/02 |

OTHER PUBLICATIONS

"Amazon Kendra—Amazon Web Services," accessed Aug. 21, 2020, 9 pages. https://aws.amazon.com/kendra/.

Take, "Who We Are," retrieved from https://www.take.net/en/who-we-are/ on Aug. 21, 2020, 5 pages.

Burnson et al., "Opportunities and Architectural Elements" retrieved from https://www.softwareadvice.com/resources/author/forrestsoftwareadvice.com on Jul. 16, 2015 (16 pages).

Custom Insight, "Employee Engagement Surveys—Employee Satisfaction Survey Tools, Programs and Research" retrieved from https://www.custominsight.com/employee-engagement-survey/ on Aug. 21, 2020, 6 pages.

Intel, "Focus on Customer Comfort to Improve Productivity and Sales", 2016, 4 pages.

Kar et al., "Applying Chatbots to the Internet of Things: Opportunities and Architectural Elements", Nov. 2016, 9 pages.

Lindberg et al., "Smart buildings that keep us comfy and content might happen sooner than you think", Jul. 16, 2018, 7 pages.

US Office Action issued in corresponding U.S. Appl. No. 17/016,830, dated Feb. 16, 2023 (36 pages).

US Office Action issued in corresponding U.S. Appl. No. 17/016,830, dated Sep. 1, 2022 (27 pages).

Wikipedia, "Amazon Alexa," Wikimedia Foundation, Inc., accessed Aug. 21, 2020, 24 pages. https://en.wikipedia.org/wiki/Amazon_Alexa.

Wikipedia, "Enterprise engagement", Wikimedia Foundation, Inc., accessed Aug. 21, 2020, 8 pages. https://en.wikipedia.org/w/index.php?tille=Enterprise%20engagement&oldid=929950455.

Wikipedia, "Google Assistant," Wikimedia Foundation, Inc., accessed Aug. 21, 2020, 13 pages. https://en.wikipedia.org/wiki/Google_Assistant.

Wikipedia, "Knowledge Engineering," Wikimedia Foundation, Inc., accessed Aug. 21, 2020, 3 pages. https://en.wikipedia.org/wiki/Knowledge_engineering.

Wikipedia, "Reasoning System," Wikimedia Foundation, Inc., accessed Aug. 21, 2020, 5 pages. https://en.wikipedia.org/wiki/Reasoning_system.

Wikipedia, "Sentiment Analysis," Wikimedia Foundation, Inc., accessed Aug. 21, 2020, 11 pages. https://en.wikipedia.org/wiki/Sentiment_analysis.

Wikipedia, "Watson (computer)," Wikimedia Foundation, Inc., accessed Aug. 21, 2020, 22 pages. https://en.wikipedia.org/wiki/Watson_(computer).

* cited by examiner

FIG. 2

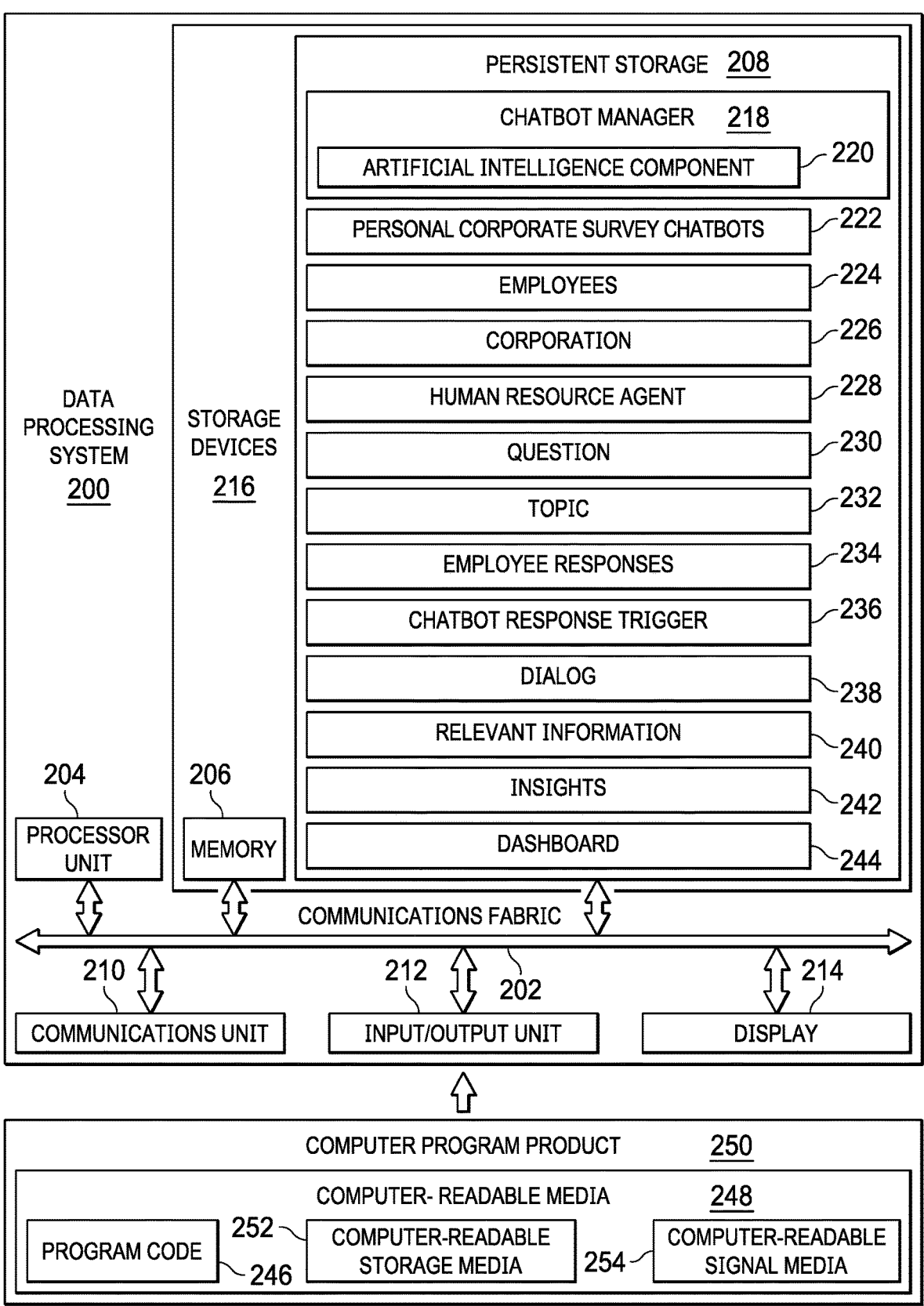

DATA PROCESSING SYSTEM 200

STORAGE DEVICES 216

PERSISTENT STORAGE   208

CHATBOT MANAGER   218

ARTIFICIAL INTELLIGENCE COMPONENT  —220

PERSONAL CORPORATE SURVEY CHATBOTS —222

EMPLOYEES —224

CORPORATION —226

HUMAN RESOURCE AGENT —228

QUESTION —230

TOPIC —232

EMPLOYEE RESPONSES —234

CHATBOT RESPONSE TRIGGER —236

DIALOG —238

RELEVANT INFORMATION —240

INSIGHTS —242

DASHBOARD —244

204

206

PROCESSOR UNIT

MEMORY

COMMUNICATIONS FABRIC

210

212   202

214

COMMUNICATIONS UNIT

INPUT/OUTPUT UNIT

DISPLAY

COMPUTER PROGRAM PRODUCT   250

COMPUTER- READABLE MEDIA   248

PROGRAM CODE

252—

246

COMPUTER-READABLE STORAGE MEDIA

254—

COMPUTER-READABLE SIGNAL MEDIA

PERSONAL CORPORATE SURVEY CHATBOT MANAGEMENT

CROSS-REFERENCE TO RELATED APPLICATIONS

This application claims priority and benefit under 35 U.S.C. § 120 as a continuation of U.S. Ser. No. 17/016,830, filed Sep. 10, 2020, the contents of which are hereby incorporated by reference herein in entirety.

BACKGROUND

1. Field

The disclosure relates generally to chatbots and more specifically to capturing mental state and work engagement of employees corresponding to a corporation based on analyzing employee responses captured by a plurality of personal corporate survey chatbots to a question posed by a chatbot manager regarding a current corporate topic.

2. Description of the Related Art

A chatbot is a computer program designed to simulate conversation with human users, especially via the Internet. Typically, a conversation with a chatbot is a back and forth dialog, such as a person speaks, the chatbot replies, the person responds to the chatbot reply, and so on. The chatbot converts the speech to text, interprets the text's meaning, and responds based on the interpretation. Based on that interpretation, and what the user had previously said, the chatbot knows what to ask or say to the person. Thus, a chatbot is designed to simulate the way a human would behave as a conversational partner.

Chatbots are used in dialog systems for various purposes including, for example, customer support, request routing, information gathering, and the like. While some chatbot applications may utilize word-classification processes, natural language processing, and artificial intelligence, others may simply scan for keywords and generate responses using common phrases obtained from an associated library or database.

SUMMARY

According to one illustrative embodiment, a computer-implemented method for analyzing chatbot/employee dialogs is provided. The computer performs an analysis of a dialog between a chatbot manager and a plurality of employees regarding a current corporate topic using an artificial intelligence component. The computer extracts relevant information regarding the current corporate topic from the dialog based on the analysis. The computer generates insights corresponding to the relevant information regarding the current corporate topic using the artificial intelligence component. The computer displays the relevant information regarding the current corporate topic and the insights in a dashboard on a client device of a human resource agent. According to another illustrative embodiment, a computer system for analyzing chatbot/employee dialogs is provided. The computer system comprises a bus system, a storage device storing program instructions connected to the bus system, and a processor executing the program instructions connected to the bus system. The computer system performs an analysis of a dialog between a chatbot manager and a plurality of employees regarding a current corporate topic using an artificial intelligence component. The computer system extracts relevant information regarding the current corporate topic from the dialog based on the analysis. The computer system generates insights corresponding to the relevant information regarding the current corporate topic using the artificial intelligence component. The computer system displays the relevant information regarding the current corporate topic and the insights in a dashboard on a client device of a human resource agent.

According to another illustrative embodiment, a computer program product for analyzing chatbot/employee dialogs is provided. The computer program product comprises a computer readable storage medium having program instructions embodied therewith, the program instructions executable by a computer to cause the computer to perform a method. The computer performs an analysis of a dialog between a chatbot manager and a plurality of employees regarding a current corporate topic using an artificial intelligence component. The computer extracts relevant information regarding the current corporate topic from the dialog based on the analysis. The computer generates insights corresponding to the relevant information regarding the current corporate topic using the artificial intelligence component. The computer displays the relevant information regarding the current corporate topic and the insights in a dashboard on a client device of a human resource agent.

According to another illustrative embodiment, a method for performing action steps based on chatbot/employee dialog analysis is provided. An analysis of a dialog between a chatbot manager and a plurality of employees regarding a current corporate topic is performed using an artificial intelligence component. Relevant information regarding the current corporate topic is extracted from the dialog based on the analysis. Insights corresponding to the relevant information regarding the current corporate topic are generated using the artificial intelligence component. A set of action steps controlling a set of systems automatically via a set of defined application programming interfaces is performed based on the relevant information and the insights.

BRIEF DESCRIPTION OF THE DRAWINGS

FIG. 2 is a diagram of a data processing system in which illustrative embodiments may be implemented;

DETAILED DESCRIPTION

Figure 1:
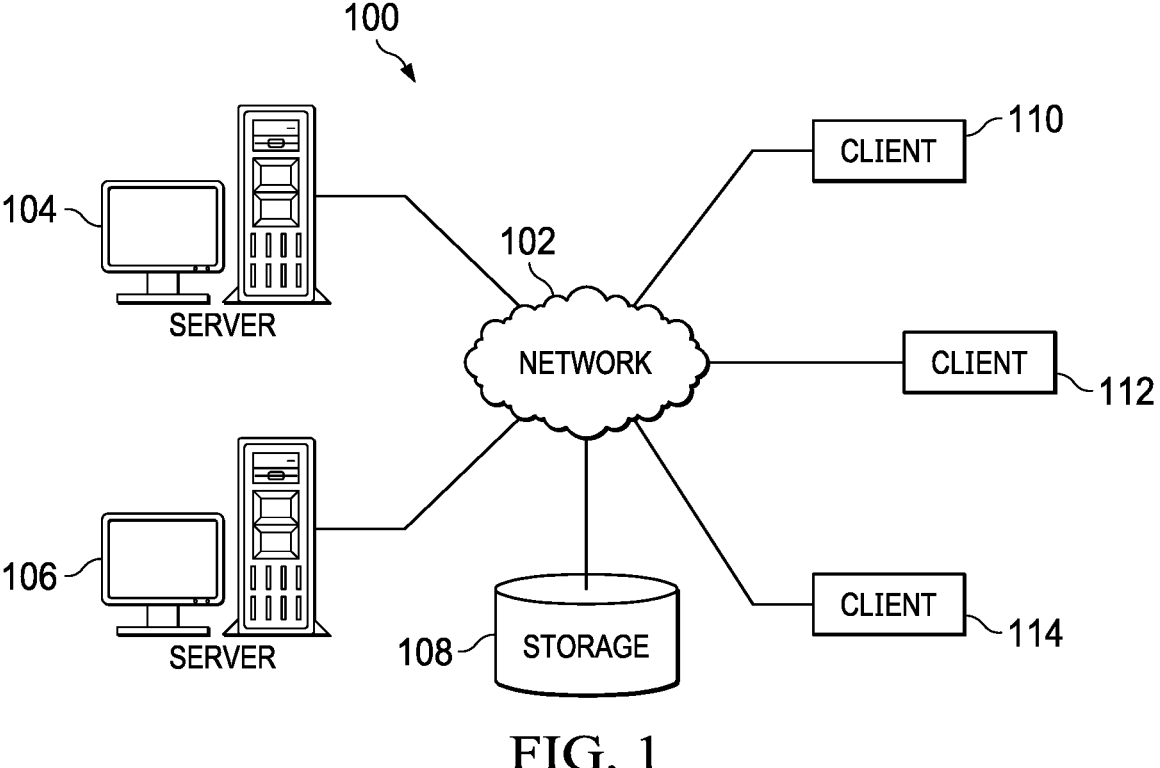
FIG. 1 is a pictorial representation of a network of data processing systems in which illustrative embodiments may be implemented.
Figure 3:
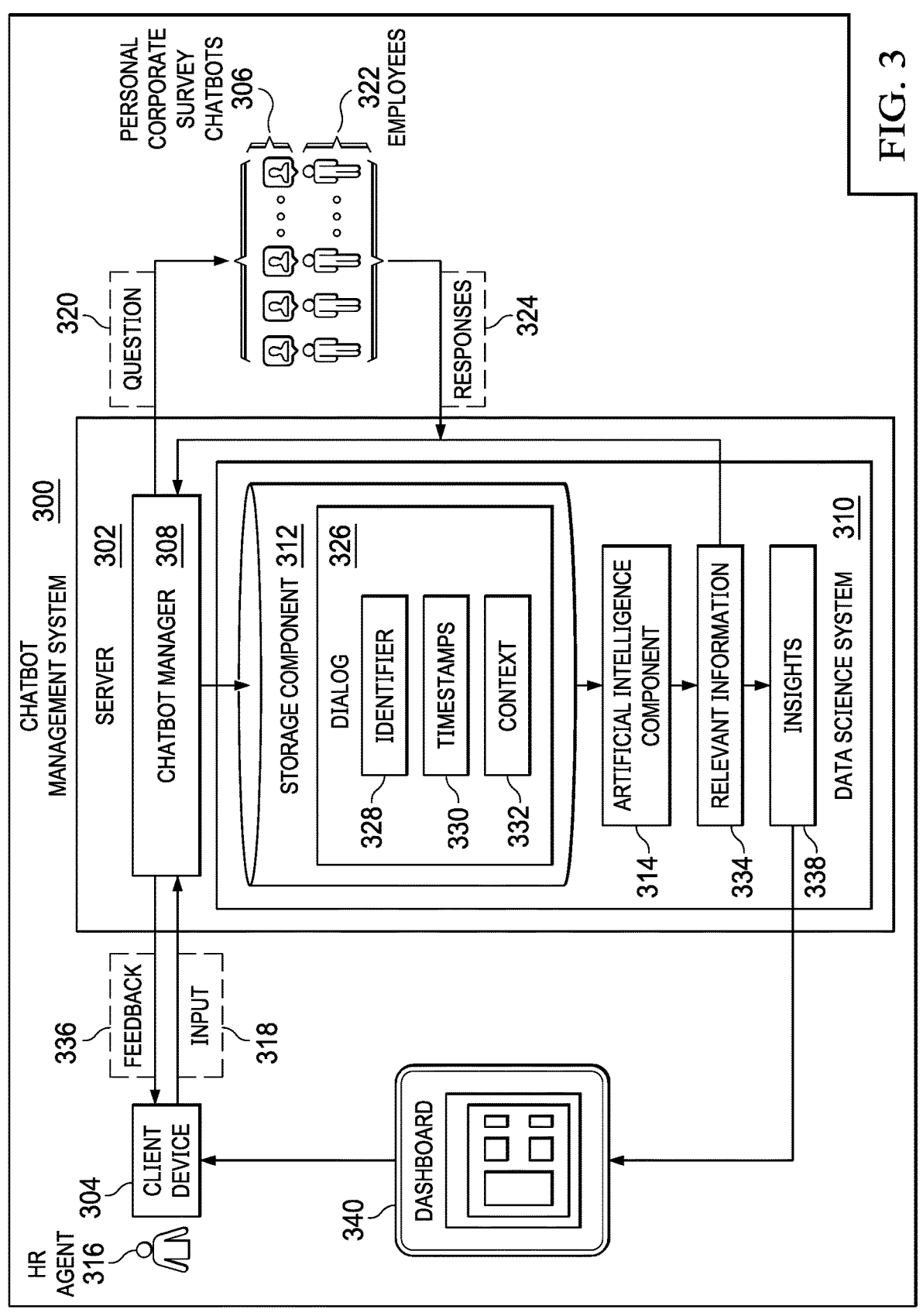
FIG. 3 is a diagram illustrating an example of a chatbot management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide chatbot management services to a plurality of client personal corporate survey chatbot devices, each respective personal corporate survey chatbot device corresponds to a particular employee of a corporation that employs a multitude of employees, such as, for example, hundreds or thousands of employees. It should be noted that the employees may be employed by a different type of entity, such as, for example, an organization, an agency, an institution, an enterprise, a business, a company, or the like, instead of a corporation. Further, it should be noted that server 104 and server 106 may provide chatbot management services to one or more corporations and/or other entities.

Server 104 and server 106 analyze employee responses, which are captured by the plurality of client personal corporate survey chatbot devices, to a question posed by a chatbot manager regarding a current corporate topic to extract relevant information, such as, for example, employee mental state, employee work engagement, employee concerns, employee work environment issues, and the like, related to the current corporate topic. The chatbot manager controls the operation of the plurality of client personal corporate survey chatbot devices and resides on server 104 and server 106.

Also, it should be noted that server 104 and server 106 may each represent clusters of servers in one or more data centers. Alternatively, server 104 and server 106 may each represent multiple computing nodes in one or more cloud environments. Further, server 104 and server 106 may provide information, such as, for example, software applications and programs, software updates, software fixes, data files, and the like to client 110, client 112, and client 114.

Client 110, client 112, and client 114 also connect to network 102. Clients 110, 112, and 114 are clients of server 104 and server 106.

In this example, client 110 may be, for example, a desktop or personal computer, a laptop computer, a handheld computer, a smart phone, a smart television, or the like, with wire or wireless communication links to network 102. In addition, client 110 may correspond to a human resource agent of the corporation. The human resource agent may be one of a person or a software program. The human resource agent may utilize client 110 to input a question regarding a current corporate topic into the chatbot manager of server 104 and server 106. The human resource agent may also input a chatbot response trigger corresponding to the question regarding the current corporate topic into the chatbot manager. The chatbot response trigger initiates an automatic response by the chatbot manager when the trigger is activated by a particular employee response to the question regarding the current corporate topic. Furthermore, the human resource agent may utilize client 110 to receive feedback and/or a dashboard containing relevant information and insights gleaned from the employee responses to the question regarding the current corporate topic. The human resource agent may utilize the information contained in the feedback and/or dashboard to modify the question or create a new question regarding the current corporate topic to collect more relevant information from the employees.

Also in this example, clients 112 and 114 represent the plurality of client personal corporate survey chatbot devices, which may have wire or wireless communication links to network 102. The plurality of client personal corporate survey chatbot devices may include, for example, stand-alone devices placed on a desk or workstation of each employee. The plurality of client personal corporate survey chatbot devices may also include mobile devices, such as, for example, smartphones, smart watches, tablets, laptops, and the like, with a chatbot application corresponding to the chatbot management service installed by server 104 or server 106 on the mobile devices.

The chatbot manager of server 104 and server 106 utilizes clients 112 and 114 (i.e., the plurality of client personal corporate survey chatbot devices) to present the question regarding the current corporate topic to the employees of the corporation and receive employee responses to the question. The chatbot manager then analyzes the employee responses using a data science system, which includes an artificial intelligence component, to extract the relevant information and generate the insights, such as, for example, issue description, root cause of the issue, possible solutions to the issue, and the like.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different client devices, identifiers for a plurality of different employees, identifiers for human resource agents, identifiers for a plurality of different chatbot/employee dialogs along with timestamps and context, and the like. Furthermore, storage 108 may store other types of data, such as authentication or credential data that may include user names, passwords, and biometric data associated with human resource agents and system administrators, for example.

In addition, it should be noted that network data processing system 100 may include any number of additional server computers, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing chatbot management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or computer readable storage medium is any piece of hardware that is capable of storing information, such as, for example, without limitation, data, computer readable program instructions in functional form, and/or other suitable information either on a transient basis or a persistent basis. Further, a computer readable storage device or computer readable storage medium excludes a propagation medium, such as a transitory signal. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores chatbot manager 218. However, it should be noted that even though chatbot manager 218 is illustrated as residing in persistent storage 208, in an alternative illustrative embodiment chatbot manager 218 may be a separate component of data processing system 200. For example, chatbot manager 218 may be a hardware component coupled to communication fabric 202 or a combination of hardware and software components. In another alternative illustrative embodiment, a first set of components of chatbot manager 218 may be located in data processing system 200 and a second set of components of chatbot manager 218 (e.g., data science system) may be located in a second data processing system, such as, for example, server 106 in FIG. 1.

Chatbot manager 218 controls the process of analyzing employee responses captured by a plurality of personal corporate survey chatbots to a question regarding a current corporate topic to extract relevant information, such as employee mental state, employee work engagement, employee concerns, work environment issues, and the like, and generate insights, such as issue description, issue root cause, possible solutions to the root cause, and the like, from the employee responses. In this example, chatbot manager 218 includes artificial intelligence manager 220. Alternatively, artificial intelligence manager 220 may be included in a data science system, which may be a separate component of data processing system 200.

Personal corporate survey chatbots 222 represent identifiers for a plurality of client personal corporate survey chatbot devices, such as, for example, clients 112 and 114 in FIG. 1, which are clients of chatbot manager 218. Employees 224 represent identifiers for a plurality of employees employed by corporation 226. Each respective employee in employees 224 corresponds to a particular personal corporate survey chatbot in personal corporate survey chatbots 222. Corporation 226 represents an identifier of the corporation, which may be any type of corporation or entity.

Human resource agent 228 represents an identifier of a particular person in the human resources department of corporation 226. However, it should be noted that human resource agent 228 may not be a person, but instead may be a human resource software program. Human resource agent 228 creates question 230 regarding topic 232. Topic 232 may be any current corporate topic, subject, matter, issue, area, focus, or the like. For example, topic 232 may be, for example, a current renovation project of corporation 226. Thus, question 230 for this example may be, "How do you like the current renovation project?" Employee responses 234 represent answers provided by employees 224 to question 230 regarding topic 232. An employee response may be, for example, "I like the renovations." Chatbot manager 218 utilizes personal corporate survey chatbots 222 to pose question 230 to employees 224 and collect employee responses 234.

Human resource agent 228 also creates chatbot response trigger 236. Chatbot response trigger 236 causes an automatic response to particular responses provided by one or more employees to question 230 regarding topic 232. In other words, chatbot response trigger 236 specifically relates to topic 232.

Dialog 238 represents a dialog identifier of the conversation between chatbot manager 218 and employees 224 and includes question 230 and all employee responses 234. Dialog 238 may also include other information, such as, for example, dialog timestamps corresponding to when question 230 was presented and when each employee response was received, along with any dialog context (e.g., geolocation, setting, situation, circumstance, environment, or the like) associated with the conversation. Chatbot manager 218 stores dialog 238 in a dialog database or storage, such as, for example, storage 108 in FIG. 1.

Chatbot manager 218 utilizes artificial intelligence component 220 to analyze dialog 238 and extract relevant information 240 and generate insights 242. Relevant information 240 is any information related to topic 232 that artificial intelligence component 220 determines to be pertinent, significant, important, or the like. Relevant information 240 may include, for example, employee sentiment, employee concern, employee engagement, work environment issues or problems, employee conflict, or the like, related to topic 232. Insights 242 represent understanding or value obtained or gained through the use of machine learning analytics by artificial intelligence component 220. Insights 242 may include, for example, root cause for a particular employee sentiment or work environment issue and a possible solution to the root cause. Chatbot manager 218 displays relevant information 240 and insights 242 in dashboard 244. Dashboard 244 is an improved graphical user interface that allows human resource agent 228 to quickly identify any issues needing to be addressed, along with any possible solutions.

Moreover, chatbot manager 218 may automatically perform a set of action steps based on the extracted relevant information and generated insights. The set of action steps may include, for example, chatbot manager 218 automatically connecting to and controlling a set of one or more other or external systems of the corporation using a set of defined application programming interfaces. For example, chatbot manager 218 may automatically control a heating, ventilation, and air conditioning system of a building corresponding to the corporation to automatically adjust a temperature in the building or in one or more specific rooms of the building in response to identifying a temperature issue in one or more employee responses complaining about the current temperature of their work environment. As another example, chatbot manager 218 may automatically control a security system of the building to automatically lock doors to the building or one or more specific doors in the building in response to identifying a security issue in one or more employee responses indicating fear due to a possible threat in their work environment. Further, chatbot manager 218 may automatically control a communication system of the building to automatically contact corporate security and/or the police department in response to identifying the security issue. As a further example, chatbot manager 218 may automatically control a fire suppression system of the building to automatically start fire suppression in the building or in one or more specific rooms of the building in response to identifying a fire issue in one or more employee responses indicating intense heat levels, heavy amounts of smoke, and/or fire in their work environment. Furthermore, chatbot manager 218 may automatically control the communication system to automatically contact the fire department in response to identifying the fire issue. Moreover, chatbot manager 218 may use the communication system to automatically contact medical professionals in response to identifying a medical issue in one or more employee responses indicating injury, shortness of breath, or the like.

As a result, data processing system 200 operates as a special purpose computer system in which chatbot manager 218 in data processing system 200 enables analysis of employee responses 234 captured by personal corporate survey chatbots 222 to question 230 regarding current corporate topic 232 to extract relevant information 240 (e.g., employee mental state, employee work engagement, employee concerns, work environment issues, and the like) and generate insights 242 (e.g., issue description, root cause, possible solutions, and the like) from employee responses 234. In particular, chatbot manager 218 transforms data processing system 200 into a special purpose computer system as compared to currently available general computer systems that do not have chatbot manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254.

In these illustrative examples, computer readable storage media 252 is a physical or tangible storage device used to store program code 246 rather than a medium that propagates or transmits program code 246. In other words, computer readable storage media 252 exclude a propagation medium, such as transitory signals. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 248" can be singular or plural. For example, program code 246 can be located in computer readable media 248 in the form of a single storage device or system. In another example, program code 246 can be located in computer readable media 248 that is distributed in multiple data processing systems. In other words, some instructions in program code 246 can be located in one data processing system while other instructions in program code 246 can be located in one or more other data processing systems. For example, a portion of program code 246 can be located in computer readable media 248 in a server computer while another portion of program code 246 can be located in computer readable media 248 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 246.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Corporations are finding it difficult to collect information from employees on a daily basis regarding topics, such as, for example, distracting noises in the work environment, cleanliness of the work environment, temperature of the work environment, and the like, which are not included in formal corporate employee engagement pulse surveys. Employee engagement is a fundamental concept in an effort to understand and describe, both qualitatively and quantitatively, the nature of the relationship between a corporation and its employees. An engaged employee is one who is enthusiastic about assigned work and takes positive action to further the corporation's interests. In contrast, a disengaged employee may be someone doing the bare minimum on assigned work (a.k.a., "coasting") or who is actively seeking to damage the corporation's reputation. If the mental state and concerns of employees regarding different topics, which are not included in formal corporate employee engagement pulse surveys, are not identified or identified too late, then employee engagement and performance may be negatively impacted, along with results of the formal corporate employee engagement pulse surveys.

Through interactions of employees with personal corporate survey chatbots, illustrative embodiments using a chatbot manager can capture, for example, the mental state (e.g., frame of mind, thoughts, opinions, viewpoints, attitudes, sentiment, and the like) of employees, possible work environment issues or problems experienced by employees, employee concerns, employee engagement with assigned work, and the like, within the corporation. The chatbot manager acts automatically in directing dialogs with the employees and generates a database of these dialogs.

Illustrative embodiments utilize a plurality of personal corporate survey chatbots that engages employees in direct dialog to collect information regarding one or more topics, such as, for example, their current mental state, active issues or concerns, level of work engagement, and the like. Analyzing this collected information from the dialogs, illustrative embodiments can generate possible solutions to address employee issues or concerns and improve or adjust resources, such as, for example, employee work environment, to improve employee mental state and engagement. Illustrative embodiments store the dialogs generated by the interactions between the personal corporate survey chatbots and employees within a database so that illustrative embodiments can extract relevant information regarding the dialog topics. Illustrative embodiments utilize a data science system to extract the relevant information. Data science is an inter-disciplinary field that uses scientific methods, processes, and algorithms to extract relevant information from structured and unstructured data.

After illustrative embodiments analyze this extracted information, illustrative embodiments can then generate insights into this extracted information, which may reveal, for example, corporate personnel issues, corporate opportunities for improvement, employee work environment problems, and the like. Upon identifying and classifying issues and opportunities, illustrative embodiments present the extracted relevant information and generated insights within a dashboard with specific alerts to appropriate corporate personnel (e.g., human resource managers, corporate executives, and the like). The internal corporate communications may be based on any messaging service owned by the corporation or operated by a third-party entity (e.g., Cisco Webex, Windows Live Messenger, Slack, or the like). Thus, illustrative embodiments, using the chatbot manager, are capable of automatically, on a day-by-day basis, capturing employee mental state, acquiring employee work engagement levels, communicating directly in real-time with employees regarding different topics not on formal surveys, developing insights into relevant information extracted from the chatbot/employee dialogs, and the like.

As an exemplary use case scenario, a corporation recently completed a renovation of the employee work environment. Human resource personnel want to know the employees' mental state (e.g., sentiment, perception, attitude, viewpoint, or the like) regarding the renovation. The personal corporate survey chatbots contact corresponding employees impacted by the renovation at a random time, for example. The chatbot may initiate the dialog with asking a question, such as, for example: "Good morning, how are you?"; "Hello, how is your work environment after the renovation?"; "Good morning, how can your work environment be improved today?"; "Hello, are you happy with your current work environment and, if not, why?"; or the like.

Based on employee responses to the question posed by the personal corporate survey chatbots to the employees, the chatbot manager using an artificial intelligence component identifies, for example, a communication pattern, such as a common issue expressed in employee responses, and seeks to determine a root cause of the issue. For example, an employee may have responded to the chatbot's question with "Today I am very angry because, when I arrived, my work station was covered with dust. Dust was even in my coffee cup." As a result, the chatbot manager may initially determine that the dust issue is a result of the renovation. The chatbot stores this relevant information in the database and presents this relevant information and insights within a dashboard display in real-time to appropriate human resource personnel. Assume that several other employees reported this same issue of dust to the personal corporate survey chatbots, which indicates an issue that the corporation needs to address. After initially determining a possible root cause of the dust (e.g., the renovation), the chatbot manager continues to ask more open questions until the chatbot manager can determine that the root cause of the dust was actually the renovation with a level of certainty above a threshold level of certainty, such as, for example, 75%, 80%, 85%, 90%, or 95% level of certainty.

As another exemplary use case scenario, the chatbot contacts employees every day at random and at random times and asks some open questions regarding the corporation's formal employee engagement pulse surveys. Based on employee responses, the chatbot manager continues to ask questions in order to identify, for example, an issue and searches to determine the root cause of the issue. However, if an employee has no interest in delving into the topic, the chatbot manager stores the captured dialog as satisfaction survey data and presents the data within the dashboard as the same. An example of this chatbot/employee dialog may be: 1) Chatbot, "Good morning, how are you feeling today? Very sad, sad, neutral, happy, or very happy?"; 2) Employee, "Very sad."; 3) Chatbot, "How can I help you to feel better?"; 4) Employee, "You can't, it's personal."; and 5) Chatbot, "Okay, I hope things get better. Have a nice day."

A human resource agent starts the process by inputting a set of questions regarding a set of topics, on a periodic basis or at random, into the chatbot manager, along with a set of chatbot response triggers corresponding to the set of questions. The chatbot manager, via a network, sends or pushes the set of questions to the plurality of personal corporate survey chatbots, each personal corporate survey chatbot in the plurality of personal corporate survey chatbots corresponds to a respective employee of the corporation. The plurality of personal corporate survey chatbots captures employee responses to the set of questions for pre-processing in a data science system of the chatbot manager. For example, questions posed by the plurality of personal corporate survey chatbots are answered by employees with statements that are preprocessed in the data science system of the chatbot manager to extract relevant information regarding the set of topics. Based on a set of chatbot response triggers or rules defined by the human resource agent, chatbot manager responses are triggered according to the statements made by the employees revealing, for example, the mental state of employees, work engagement of employees, issues or problems described by employees, concerns of employees, and the like. As a result, the dialog between a particular employee and a corresponding personal corporate survey chatbot may include any type of dialog based on defined chatbot response triggers.

Thus, illustrative embodiments provide one or more technical solutions that overcome a technical problem with chatbot/employee dialog analysis and interpretation. As a result, these one or more technical solutions provide a technical effect and practical application in the field of chatbots.

With reference now to FIG. 3, a diagram illustrating an example of a chatbot management system is depicted in accordance with an illustrative embodiment. Chatbot management system 300 may be implemented in a network of data processing systems, such as network data processing system 100 in FIG. 1. Chatbot management system 300 is a system of hardware and software components for capturing mental state and work engagement of employees corresponding to a corporation based on analyzing employee responses captured by a plurality of personal corporate survey chatbots to a question posed by a chatbot manager regarding a current corporate topic.

In this example, chatbot management system 300 includes server 302, client device 304, and personal corporate survey chatbots 306. Server 302, client device 304, and personal corporate survey chatbots 306 may be, for example, server 104, client 110, and clients 112 and 114 in FIG. 1, respectively. However, it should be noted that chatbot management system 300 is intended as an example only and not as a limitation on illustrative embodiments. In other words, chatbot management system 300 may include any number of servers, clients, and personal corporate survey chatbots.

In this example, server 302 includes chatbot manager 308, such as, for example, chatbot manager 218 in FIG. 2, and data science system 310. Data science system 310 includes storage component 312 and artificial intelligence component 314.

Storage component 312 is storage for chatbot/employee dialogs and may be a traditional database. Storage component 312 stores the dialogs, along with other information, such as timestamps corresponding to the dialogs, context of the dialogs, who designed the questions (i.e., human resource agent identifier), who responded to the questions (i.e., employee identifiers), and the like. Also, it should be noted that storage component 312 may store the dialog information in a structured or an unstructured format.

Artificial intelligence component 314 may utilize machine learning to perform various analyses, such as, for example, speech recognition, speech-to-text conversion, natural language processing, pattern recognition, data statistics analysis, sentiment analysis, anomaly detection, question and answer classification, root cause analysis, and the like. Artificial intelligence component 314 may also provide levels of anonymization to collected employee responses for employee privacy and security. Artificial intelligence component 314 provides the basis for the general operation of chatbot manager 308 and contains general rules for the operation, along with knowledge engineering techniques and logical reasoning (e.g., deductive, inductive, and abductive reasoning) to generate relevant information and insights. Output of artificial intelligence component 314 may be, for example, structured dialogs, with corresponding classifications, sentiments, targets, contexts, and the like.

Chatbot manager 308 receives a flow of questions and chatbot response triggers from human resource agent 316 via client device 304 as input 318. Human resource agent 316 may create the flow of questions as original questions or as variants of answers recently provided by employees to help identify root causes of work environment issues or determine possible solutions to employee concerns, for example. Human resource agent 316 may define triggers or rules for chatbot manager 308 responses according to spontaneous manifestations or according to employee responses during current dialogs. For example, in the event a new work task is assigned to a set of employees, human resource agent 316 can proactively define a chatbot response explaining details of the new task and deadlines associated with the work. As another example, in the event an employee answers chatbot manager 308 posed questions regarding different topics with a particular sentiment (e.g., anger) over a certain period of time, human resource agent 316 can proactively start a specific set of questions regarding workplace satisfaction for that particular employee, which may provide human resource agent 316 with preventive information (e.g., how to resolve the employee's anger before a situation or issue arises). Chatbot manager 308 stores the flow of questions and chatbot response triggers in storage component 312.

Chatbot manager 308 presents question 320 to employee 322 via personal corporate survey chatbots 306. Question 320 may be any type of question corresponding to a current corporate topic, such as, topic 232 in FIG. 2. Personal corporate survey chatbots 306 receive responses 324 to question 320 from employee 322 and transmit responses 324 to chatbot manager 308. In addition, chatbot manager 308 may utilize a question answering system to answer questions posed by one or more employees in responses 324. Further, employees 322 may provide suggestions for improvements, compliments regarding changes, or the like in responses 324.

Chatbot manager 308 stores employee responses 324, along with question 320, in storage component 312 as dialog 326. In addition to employee responses 324 and question 320, dialog 326 includes identifier 328, timestamps 330, and context 332. Chatbot manager 308 sends dialog 326 to artificial intelligence component 314 for analysis.

Artificial intelligence component 314 analyzes dialog 326 to extract relevant information 334 corresponding to the current corporate topic. Relevant information 334 may include, for example, current mental state of employees (e.g., how they are feeling), targets (e.g., other employees) of the dialog, work environment issues, employee engagement with assigned work-related tasks, employee concerns, and the like. Artificial intelligence component 314 summarizes relevant information 334 in a report and sends the report to chatbot manager 308. Chatbot manager 308 then sends the summary report to human resource agent 316 via client device 304 as feedback 336. Human resource agent 316 may utilize feedback 336 to modify previously asked questions or to develop new questions in an effort to continue to collect relevant information or higher quality information from employees 322 regarding the current corporate topic.

Furthermore, artificial intelligence component 314 can execute chatbot response triggers defined by human resource agent 316 based on employee responses 324. For example, based on a current renovation job in an employee breakroom (i.e., the current corporate topic), human resource agent 316 may define a chatbot response trigger for when a received employee response contains negative sentiment regarding cleanliness of the breakroom due to the renovation. Upon activation of the chatbot response trigger by the negative sentiment expressed in the employee response, the chatbot response trigger automatically sends a reply to that employee stating, for example, "Sorry for the inconvenience, the breakroom renovation is set to finish on Friday."

Moreover, artificial intelligence component 314 generates insights 338 based on relevant information 334 extracted from dialog 326 regarding the current corporate topic. Insights 338 may include, for example, root cause of any issue, sentiment, concern, complaint, or problem and one or more possible solutions to the root cause. Insights 338 may also include statistics, highlights, alerts, and the like. Chatbot manager 308 places relevant information 334 and insights 338 in dashboard 340.

Dashboard 340 is a graphical user interface that renders relevant information 334 and insights 338 on client device 304. Dashboard 340 structures and displays relevant information 334 and insights 338 for easier review and understanding by human resource agent 316.

Figure 4A:
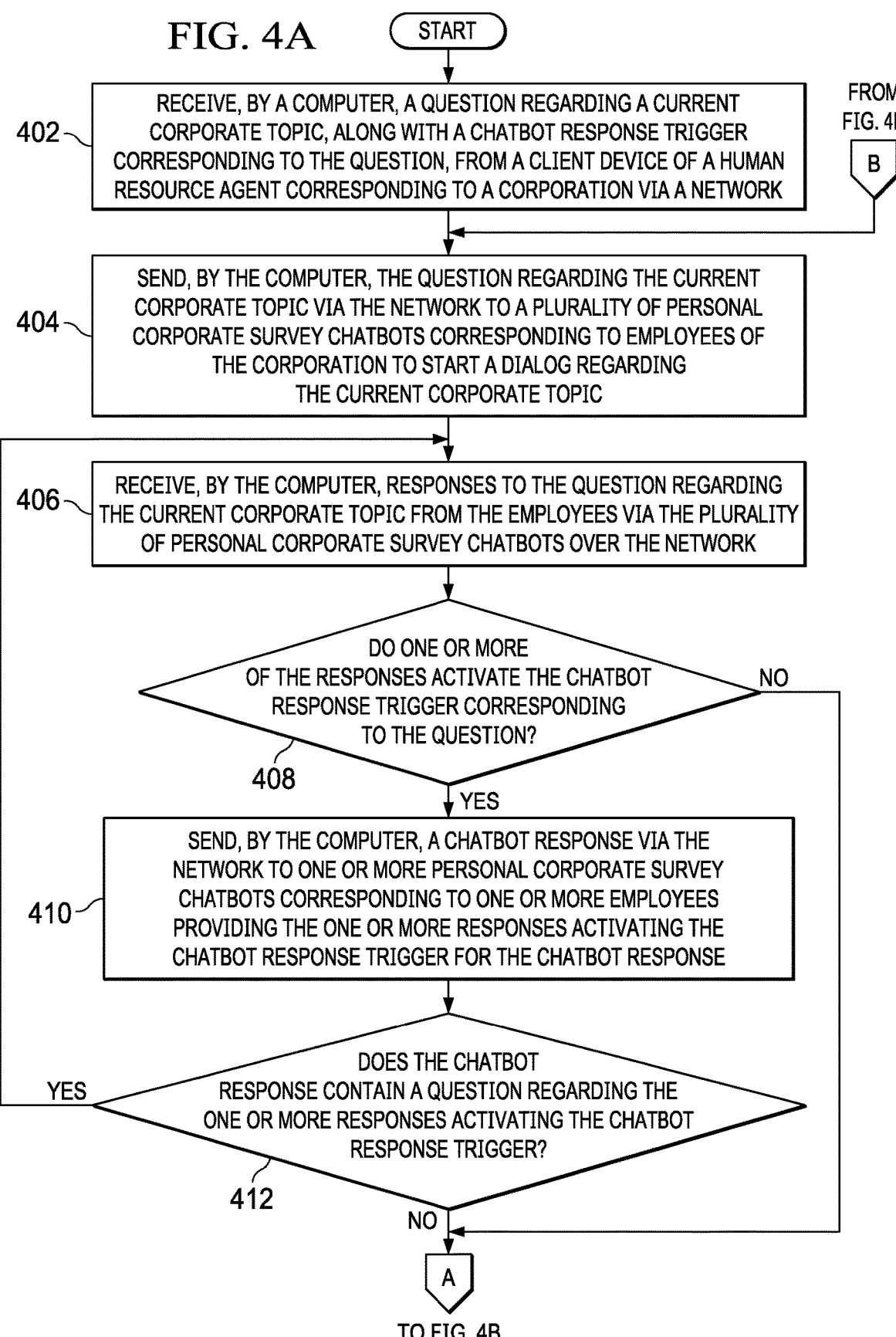
FIGS. 4A-4B are a flowchart illustrating a process for analyzing employee responses to a question posed by a chatbot manager regarding a current corporate topic in accordance with an illustrative embodiment.
Figure 4B:
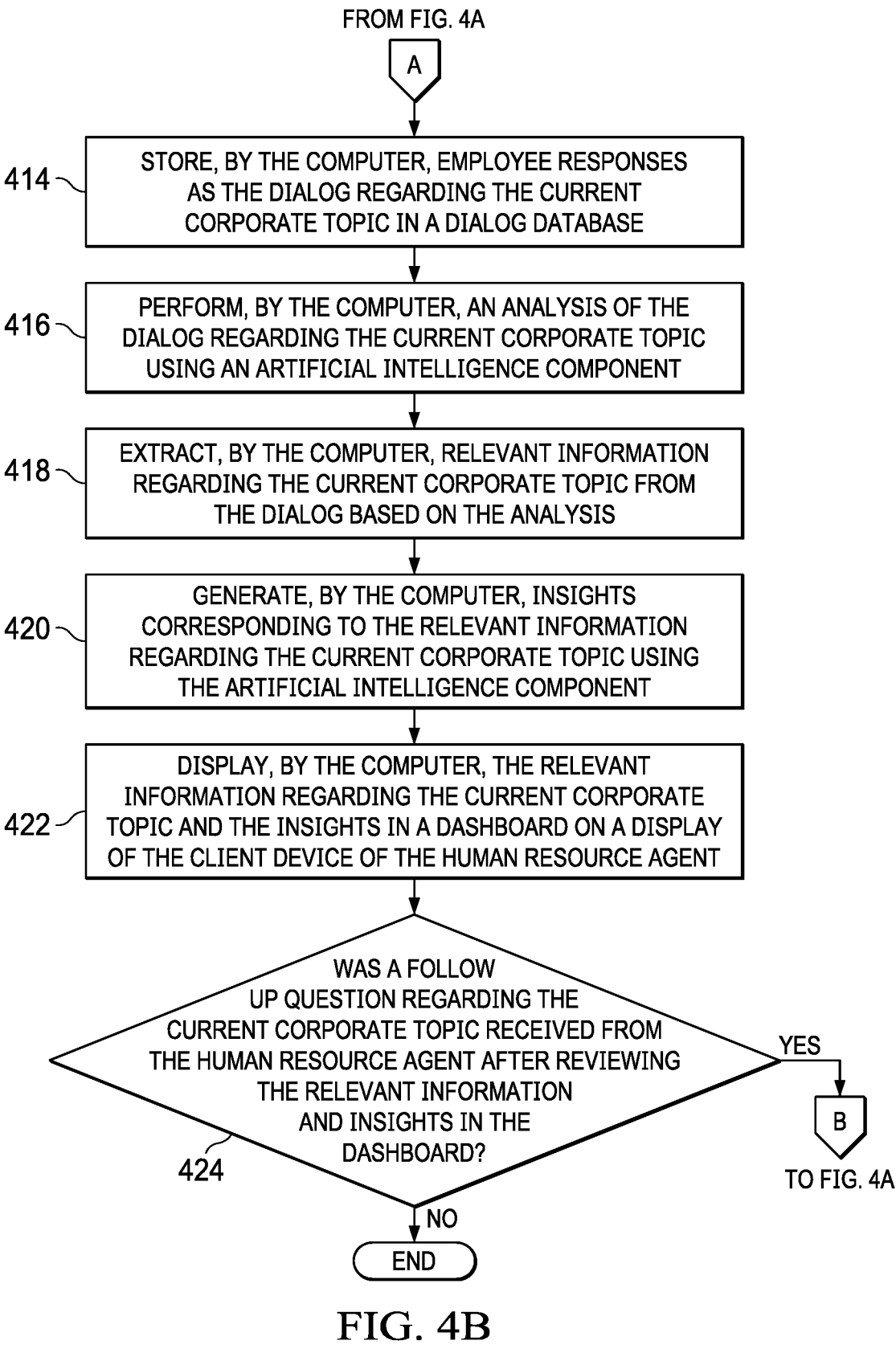

With reference now to FIGS. 4A-4B, a flowchart illustrating a process for analyzing employee responses to a question posed by a chatbot manager regarding a current corporate topic is shown in accordance with an illustrative embodiment. The process shown in FIGS. 4A-4B may be implemented in a computer, such as, for example, server 104 in FIG. 1 or data processing system 200 in FIG. 2. For example, the process can be implemented in chatbot manager 218 in FIG. 2.

The process begins when the computer, using the chatbot manager, receives a question regarding a current corporate topic, along with a chatbot response trigger corresponding to the question, from a client device of a human resource agent corresponding to a corporation via a network (step 402). The computer, using the chatbot manager, sends the question regarding the current corporate topic via the network to a plurality of personal corporate survey chatbots corresponding to employees of the corporation to start a dialog regarding the current corporate topic (step 404). The computer, using the chatbot manager, receives responses to the question regarding the current corporate topic from the employees via the plurality of personal corporate survey chatbots over the network (step 406).

The computer, using the chatbot manager, makes a determination as to whether one or more of the responses activate the chatbot response trigger corresponding to the question (step 408). If the computer, using the chatbot manager, determines that none of the responses activate the chatbot response trigger corresponding to the question, no output of step 408, then the process proceeds to step 414. If the computer, using the chatbot manager, determines that one or more of the responses activate the chatbot response trigger corresponding to the question, yes output of step 408, then the computer, using the chatbot manager, sends a chatbot response via the network to one or more personal corporate survey chatbots corresponding to one or more employees providing the one or more responses activating the chatbot response trigger for the chatbot response (step 410).

In addition, the computer, using the chatbot manager, makes a determination as to whether the chatbot response contains a question regarding the one or more responses activating the chatbot response trigger (step 412). If the computer, using the chatbot manager, determines that the chatbot response does contain a question regarding the one or more responses activating the chatbot response trigger, yes output of step 412, then the process returns to step 406 where the computer receives responses to the question from the one or more employees providing the one or more responses activating the chatbot response trigger. If the computer, using the chatbot manager, determines that the chatbot response does not contain a question regarding the one or more responses activating the chatbot response trigger, no output of step 412, then the computer, using the chatbot manager, stores all employee responses as the dialog regarding the current corporate topic in a dialog database (step 414).

Further, the computer, using the chatbot manager, performs an analysis of the dialog regarding the current corporate topic using an artificial intelligence component of a data science system of the chatbot manager (step 416). Furthermore, the computer, using the chatbot manager, extracts relevant information regarding the current corporate topic from the dialog based on the analysis (step 418). Moreover, the computer, using the chatbot manager, generates insights corresponding to the relevant information regarding the current corporate topic using the artificial intelligence component (step 420).

The computer, using the chatbot manager, displays the relevant information regarding the current corporate topic and the insights in a dashboard on a display of the client device of the human resource agent (step 422). The computer, using the chatbot manager, makes a determination as to whether a follow up question regarding the current corporate topic was received from the human resource agent after reviewing the relevant information and insights in the dashboard (step 424). If the computer, using the chatbot manager, determines that a follow up question regarding the current corporate topic was received from the human resource agent after reviewing the relevant information and insights in the dashboard, yes output of step 424, then the process returns to step 404 where the computer, using the chatbot manager, sends the follow up question via the network to the plurality of personal corporate survey chatbots corresponding to the employees. If the computer, using the chatbot manager, determines that a follow up question regarding the current corporate topic was not received from the human resource agent after reviewing the relevant information and insights in the dashboard, no output of step 424, then the process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for analyzing employee responses captured by a plurality of personal corporate survey chatbots to a question regarding a current corporate topic to extract relevant information, such as employee mental state, employee work engagement, employee concerns, work environment issues, and the like, and generate insights, such as issue root cause, possible solutions to the root cause, and the like, from the employee responses. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for analyzing chatbot dialogs, comprising:

transmitting, by a data processing system comprising a processor coupled with memory, via a network, a question from an administrator device to a chatbot corresponding to a client device to generate a dialog between the chatbot and the client device;

receiving, by the data processing system via the network, a response to the transmitted question from the client device for inclusion in the dialog;

determining, by the data processing system, that the response corresponds to a response trigger corresponding to the question;

transmitting, by the data processing system via the network, responsive to determining that the response corresponds to the response trigger, a chatbot response for inclusion in the dialog, to the client device providing the response;

determining, by the data processing system, that the chatbot response does not include a second question regarding the response corresponding to the response trigger;

storing, by the data processing system, the dialog comprising the question, the response, the chatbot response, and an identifier in a dialog database;

analyzing, by the data processing system, the dialog, which comprises the question, the response, and the chatbot response, using an artificial intelligence component executing at least one of speech recognition, speech-to-text conversion, natural language processing, pattern recognition, data statistics analysis, sentiment analysis, anomaly detection, question and answer classification, or root cause analysis;

generating, by the data processing system, insights based on the analyzed dialog, wherein the insights comprise at least i) a root cause of at least one of an issue, a sentiment, a concern, a complaint, or a problem and ii) one or more solutions to the root cause;

displaying, by the data processing system, the insights in a dashboard on a display of the administrator device; and transmitting, by the data processing system, using an application programming interface, in response to a level of certainty in the root cause being greater than a certainty threshold, a control signal to a temperature control system of a building, to cause the temperature control system to modify the temperature of a room in the building to resolve the root cause using the one or more solutions to the root cause.

2. The method of claim 1, further comprising:

receiving, by the data processing system via the network, the question and the response trigger corresponding to the question from the administrator device.

3. The method of claim 1, further comprising:

extracting, by the data processing system, relevant information from the dialog based on the analysis.

4. The method of claim 1, further comprising:

analyzing, by the data processing system, the dialog using the artificial intelligence component to generate a structured dialog.

5. The method of claim 1, further comprising:

analyzing, by the data processing system, the dialog using the artificial intelligence component to generate a structured dialog; and generating, by the data processing system, the insights based on the structured dialog generated using the artificial intelligence component.

6. The method of claim 1, further comprising:

determining, by the data processing system, that a third question has been received from the administrator device responsive to displaying the insights in the dashboard; and transmitting, by the data processing system, the third question to the client device for inclusion in the dialog.

7. The method of claim 1, further comprising:

receiving, by the data processing system, a plurality of responses to the question from a plurality of client devices, wherein the response and one or more of the plurality of responses include the complaint about the temperature;

generating, by the data processing system, insights based on the analyzed dialog and the analyzed plurality of responses, wherein the insights comprise i) the room of the building, ii) the root cause includes a complaint about the temperature in the room based on the response and the one or more of the plurality of responses, and iii) the one or more solutions include modifying the temperature of the room;

determining, by the data processing system, based on the analyzed dialog and the analyzed plurality of responses, the level of certainty of the root cause; and transmitting, by the data processing system, the control signal based on the insights.

8. The method of claim 1, wherein the response includes an indication of a possible threat, the insights include a room, the root cause includes a security issue, and the one or more solutions to the root cause include locking a door, further comprising:

locking, by the data processing system, based on the insights, the door corresponding to the room to resolve the root cause using the one or more solutions to the root cause.

9. The method of claim 1, further comprising:

generating, by the data processing system, a communication corresponding to the response, based on the generated insights; and transmitting, by the data processing system, the communication to a second client device.

10. The method of claim 1, further comprising:

extracting, by the data processing system, based on analyzing the dialog, a first indication from the response and a second indication from the response, wherein the first indication includes at least one of intense heat levels, heavy amounts of smoke, and fire, and the second indication includes a room;

generating, by the data processing system, the insights based on the analyzed dialog, the first indication, and the second indication, wherein the insights comprise i) the root cause, including a fire issue and ii) the one or more solutions, including controlling a fire suppression system; and controlling, by the data processing system, based on the insights, the fire suppression system in the room to resolve the root cause using the one or more solutions to the root cause.

11. A method to control an external system, comprising:

transmitting, by a data processing system comprising a processor coupled with memory, via a network, a question from an administrator device to a chatbot corresponding to a client device to generate a dialog between the chatbot and the client device;

receiving, by the data processing system via the network, a response to the transmitted question from the client device for inclusion in the dialog, wherein the response includes an indication of a possible threat;

determining, by the data processing system, that the response corresponds to a response trigger corresponding to the question;

transmitting, by the data processing system via the network, responsive to determining that the response corresponds to the response trigger, a chatbot response for inclusion in the dialog, to the client device providing the response;

determining, by the data processing system, that the chatbot response does not include a second question regarding the response corresponding to the response trigger;

storing, by the data processing system, the dialog comprising the question, the response, the chatbot response, and an identifier in a dialog database;

analyzing, by the data processing system, the dialog, which comprises the question, the response, and the chatbot response, using an artificial intelligence component executing at least one of speech recognition, speech-to-text conversion, natural language processing, pattern recognition, data statistics analysis, sentiment analysis, anomaly detection, question and answer classification, or root cause analysis;

generating, by the data processing system, insights based on the analyzed dialog, wherein the insights comprise at least i) a root cause of at least one of an issue, a sentiment, a concern, a complaint, or a problem and ii) one or more solutions to the root cause, wherein the root cause includes a security issue and the one or more solutions to the root cause include locking a door to a room; and controlling, by the data processing system, the external system, based on the generated insights, to lock the door corresponding to the room to resolve the root cause using the one or more solutions to the root cause.

12. The method of claim 11, further comprising:

receiving, by the data processing system via the network, the question and the response trigger corresponding to the question from the administrator device.

13. The method of claim 11, further comprising:

extracting, by the data processing system, relevant information from the dialog based on the analysis.

14. The method of claim 11, further comprising:

analyzing, by the data processing system, the dialog using the artificial intelligence component to generate a structured dialog.

15. The method of claim 11, further comprising:

analyzing, by the data processing system, the dialog using the artificial intelligence component to generate a structured dialog; and generating, by the data processing system, the insights based on the structured dialog generated using the artificial intelligence component.

16. The method of claim 11, further comprising:

receiving, by the data processing system, a plurality of responses to the question from a plurality of client devices, wherein the response and one or more of the plurality of responses include the complaint about a temperature;

generating, by the data processing system, insights based on the analyzed dialog and the analyzed plurality of responses, wherein the insights comprise i) the room of a building, ii) the root cause includes a complaint about the temperature in the room based on the response and the one or more of the plurality of responses, and iii) the one or more solutions include modifying the temperature of the room; and determining, by the data processing system, based on the analyzed dialog and the analyzed plurality of responses, a level of certainty of the root cause;

wherein controlling the external system comprises:

transmitting, by the data processing system, using an application programming interface, in response to the level of certainty being greater than a certainty threshold, a control signal to a temperature control system of the building, to cause the temperature control system to modify the temperature of the room to resolve the root cause using the one or more solutions to the root cause.

17. The method of claim 11, further comprising:

generating, by the data processing system, a communication corresponding to the response, based on the generated insights; and transmitting, by the data processing system, the communication to the external system.

18. The method of claim 11, further comprising:

controlling, by the data processing system, the external system, based on the generated insights, wherein the external system is a fire suppression system associated with the response.

19. The method of claim 11, further comprising:

extracting, by the data processing system, based on analyzing the dialog, a first indication from the response and a second indication from the response, wherein the first indication includes at least one of intense heat levels, heavy amounts of smoke, and fire, and the second indication includes a room;

generating, by the data processing system, the insights based on the analyzed dialog, the first indication, and the second indication, wherein the insights comprise i) the root cause, including a fire issue and ii) the one or more solutions, including controlling a fire suppression system; and controlling, by the data processing system, in response to generating the insights, the fire suppression system in the room to resolve the root cause using the one or more solutions to the root cause.

20. A system, comprising:

one or more processors, coupled with memory, to:

transmit, via a network, a question from an administrator device to a chatbot corresponding to a client device to generate a dialog between the chatbot and the client device;

receive, via the network, a response to the transmitted question from the client device for inclusion in the dialog;

determine that the response corresponds to a response trigger corresponding to the question;

transmit, via the network, responsive to determining that the response corresponds to the response trigger, a chatbot response for inclusion in the dialog, to the client device providing the response;

determine that the chatbot response does not include a second question regarding the response corresponding to the response trigger;

store the dialog comprising the question, the response, the chatbot response, and an identifier in a dialog database;

analyze the dialog using an artificial intelligence component executing at least one of speech recognition, speech-to-text conversion, natural language processing, pattern recognition, data statistics analysis, sentiment analysis, anomaly detection, question and answer classification, or root cause analysis;

extracting, based on analyzing the dialog, a first indication from the response and a second indication from the response, wherein the first indication includes at least one of intense heat levels, heavy amounts of smoke, and fire, and the second indication includes a room generate insights based on the analyzed dialog, the first indication, and the second indication, wherein the insights comprise at least i) a root cause of at least one of an issue, a sentiment, a concern, a complaint, or a problem and ii) one or more solutions to the root cause, wherein the root cause includes a fire issue and the one or more solutions include controlling a fire suppression system;

display the insights in a dashboard on a display of the administrator device; and control, based on the insights, the fire suppression system in the room to resolve the root cause using the one or more solutions to the root cause.

* * * * *